US012797720B2

(12) United States Patent
Jo

(10) Patent No.: US 12,797,720 B2
(45) Date of Patent: Nov. 17, 2026

(54) GAME SERVICE METHOD AND DEVICE USING TIME RESOURCE ELEMENT

(71) Applicant: Mistil Games Co., Ltd., Gyeonggi-do (KR)

(72) Inventor: Yong Min Jo, Gyeonggi-do (KR)

(73) Assignee: Mistil Games Co., Ltd., Gyeonggi-do (KR)

( * ) Notice: Subject to any disclaimer, the term of this patent is extended or adjusted under 35 U.S.C. 154(b) by 229 days.

(21) Appl. No.: 18/820,385

(22) Filed: Aug. 30, 2024

(65) Prior Publication Data

US 2025/0276241 A1 Sep. 4, 2025

(30) Foreign Application Priority Data

Feb. 29, 2024 (KR) ........................ 10-2024-0029370
Jun. 5, 2024 (KR) ........................ 10-2024-0073829

(51) Int. Cl.

| | |
|---|---|
| ***A63F 13/44*** | (2014.01) |
| ***A63F 13/58*** | (2014.01) |
| ***A63F 13/67*** | (2014.01) |
| ***A63F 13/837*** | (2014.01) |

(52) U.S. Cl.

CPC .............. *A63F 13/44* (2014.09); *A63F 13/58* (2014.09); *A63F 13/67* (2014.09); *A63F 13/837* (2014.09); *A63F 2300/63* (2013.01); *A63F 2300/638* (2013.01)

(58) Field of Classification Search

CPC .......... A63F 13/44; A63F 13/58; A63F 13/67; A63F 13/837; A63F 2300/63; A63F 2300/638
USPC ............................................................ 463/31
See application file for complete search history.

(56) References Cited

U.S. PATENT DOCUMENTS

| | | | | |
|---|---|---|---|---|
| 8,480,492 | B2 * | 7/2013 | Kataoka | A63F 13/56 463/36 |
| 2012/0214562 | A1 | 8/2012 | Im | |
| 2022/0280871 | A1 | 9/2022 | Nakada et al. | |

FOREIGN PATENT DOCUMENTS

| | | | |
|---|---|---|---|
| JP | 2000093646 | A | 4/2000 |
| JP | 2001104643 | A | 4/2001 |
| JP | 2019084164 | A | 6/2019 |
| JP | 7173596 | B2 | 11/2022 |
| JP | 2023170772 | A | 12/2023 |

(Continued)

OTHER PUBLICATIONS

"Event Types—Burnout Revenge Guide—IGN", dated Mar. 28, 2012; https://www.ign.com/wikis/burnout-revenge/Event_Types (Year: 2012).*

(Continued)

*Primary Examiner* — Allen Chan
(74) *Attorney, Agent, or Firm* — Downs Rachlin Martin PLLC

(57) ABSTRACT

Disclosed are a game service method and device using a time resource element. The game service method includes allocating a time resource and a physical strength resource to each of user characters including a first user character and a second user character, when a game stage starts, reducing the time resource held by each of the user characters as time elapses, when at least one first event occurs, reducing the time resource held by the first user character, and, when at least one second event distinguished from the first event occurs, increasing the time resource held by the first user character.

19 Claims, 16 Drawing Sheets

(56) References Cited

FOREIGN PATENT DOCUMENTS

| | | | |
|---|---|---|---|
| KR | 20120096778 | A | 8/2012 |
| KR | 101221613 | B1 | 1/2013 |

OTHER PUBLICATIONS

"Sand of Hours—Zelda Wiki", game released on Oct. 1, 2007; https://zelda.fandom.com/wiki/Sand_of_Hours (Year: 2007).*

Google search results for "burnout revenge bonus time" (Year: 2026).*

Resident Evil RE4 the Mercenaries Mode Free Additional Other Ding Ding Etc. Naver Blog : Post content print webpage at https://blog.naver.com/wolf5160/223067803085 (Apr. 7, 2023).

The Life Series Wiki. "Limited Life." Fandom URL: https://the-life-series.fandom.com/wiki/Limited_Life? Last viewed on Dec. 11, 2025.

Sega. "Sonic Runners" has been upgraded to a major version with new features "Quick Mode" and "Daily Battle"! https://www.sega.jp/topics/detail/151127_apps_2/ Nov. 27, 2015.

Squad Wiki. "Head-up display (HUD)" Fandom URL: https://web.archive.org/web/20230308092729/https://squad.fandom.com/wiki/Head-up_display_(HUD) Oct. 14, 1995.

* cited by examiner

FIG. 7
715
PHASE 02
Time energy is further rapidly consumed.
06:56

710

720

725

GAME SERVICE METHOD AND DEVICE USING TIME RESOURCE ELEMENT

CROSS-REFERENCE TO RELATED APPLICATION(S)

This application claims the priority benefit of Korean Patent Application No. 10-2024-0029370 filed on Feb. 29, 2024, and Korean Patent Application No. 10-2024-0073829 filed on Jun. 5, 2024, in the Korean Intellectual Property Office, the disclosures of which are incorporated herein by reference for all purposes.

BACKGROUND

1. Field

One or more embodiments relate to a game service method using a time resource element.

2. Description of Related Art

The advancement of game-related technology has led to the emergence of various game methods. Examples are a first-person shooter (FPS) game and a third-person shooter game (TPS). An FPS game is a game genre where a user travels through a three-dimensional space from the perspective of a game character and attacks enemies with projectile weapons, like guns, whereas a TPS game is a similar genre but where a third-person perspective is used.

SUMMARY

According to an embodiment, a game service method using a time resource element includes allocating a time resource and a physical strength resource to each of user characters including a first user character and a second user character; when a game stage starts, reducing the time resource held by each of the user characters as time elapses; when at least one first event occurs, reducing the time resource held by the first user character; and, when at least one second event distinguished from the first event occurs, increasing the time resource held by the first user character.

According to an embodiment, a game service device includes a communication circuit configured to communicate with user terminals configured to manipulate each of user characters including a first user character and a second user character; one or more processors configured to control a game service according to the manipulation of each of the user characters; and a memory configured to store instructions executable by the one or more processors, in which, when the executable instructions are executed by the one or more processors, the one or more processors are configured to allocate a time resource and a physical strength resource to each of the user characters including the first user character and the second user character, when a game stage starts, reduce the time resource held by each of the user characters as time elapses, when at least one first event occurs, reduce the time resource held by the first user character, and, when at least one second event distinguished from the first event occurs, increase the time resource held by the first user character.

DETAILED DESCRIPTION

Figure 1:
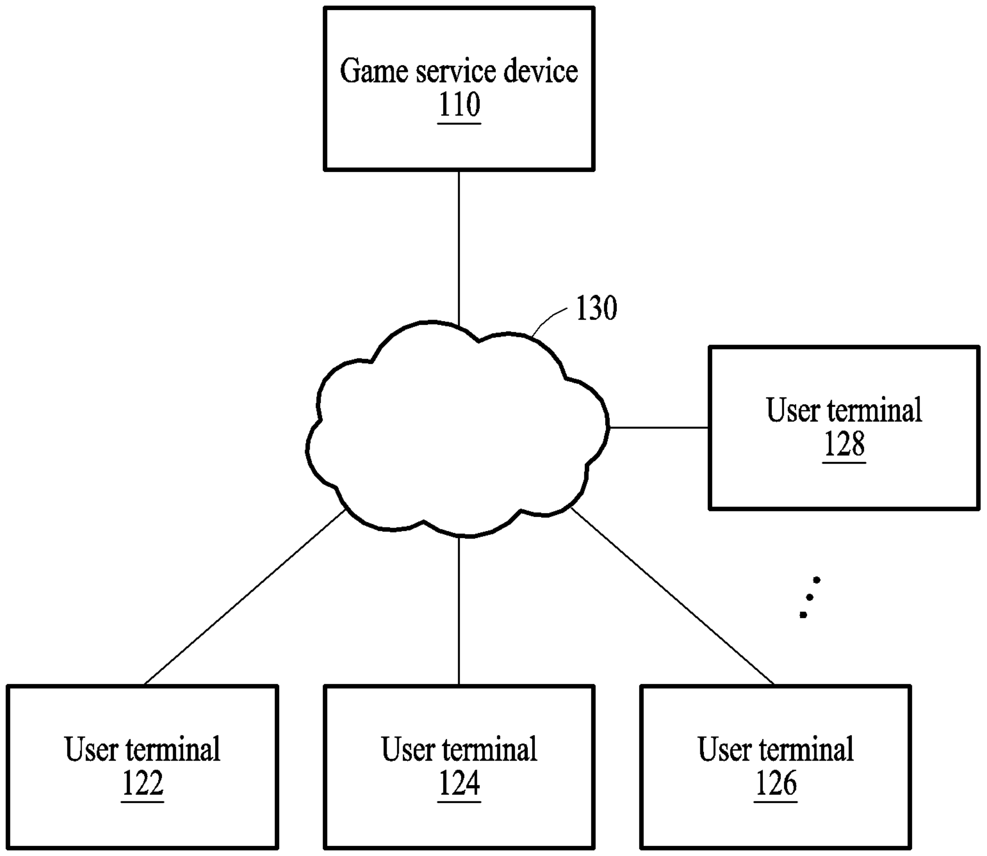
FIG. 1 is a diagram illustrating an overview of a game service provision system according to an embodiment.

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. The module may be implemented in a form of an application-specific integrated circuit (ASIC).

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating an overview of a game service provision system according to an embodiment.

Referring to FIG. 1, the game service provision system may provide a game service to a plurality of user terminals (e.g., user terminals 122, 124, 126, and 128) through a game service device 110. The game service provision system includes the game service device 110, a network 130, and one or more user terminals. The game service device 110 and each of the user terminals may communicate with each other through a network (e.g., an Internet communication network or a wired or wireless short-range communication network or wide-range data communication network).

The game service device 110 may perform an authentication process for a user terminal that has requested access to execute a game program and may provide a game service to the user terminal for which authentication has been completed. The game service device 110 may manage and control the game service provided to the user terminal. The game service device 110 may be, for example, a server device or a cloud computing device, but examples are not limited to the foregoing examples.

A user (or a gameplayer) who wants to play a game may execute a game application (or the game program) installed on the user terminal and may request access to the game service device 110. The user terminal is a computing device that allows the user to access a game through an online connection and may include, for example, a cellular phone, a smartphone, a personal computer, a laptop, a notebook, a netbook, a tablet, or a personal digital assistant (PDA), but examples are not limited to the foregoing examples.

In an embodiment, each of users may play the game by accessing the game service device 110 by using their user terminal. The game service device 110 may match users who are going to play the game together and may provide the game service to the matched users. The game service may be, for example, a game service for a third-person shooter (TPS) game or a first-person shooter (FPS) game.

The user may select a gameplay mode after accessing the game service device 110 through their user terminal. The gameplay mode may include, for example, a single mode and a duo mode. The single mode refers to a game mode in which a defined number of users (e.g. 8) compete against each other alone through each user character. The duo mode refers to a game mode in which two users form a team and compete against one or more other teams. After selecting the gameplay mode, when the matching of the users who are going to play the game is completed, a user may select a user character (or a game character) to be played by the user and a weapon and/or a skill to be used by the user character. In the duo mode, the users having formed a team may sequentially select user characters. In the duo mode, the strengths of team members may be strengthened, and the weaknesses of the team members may be complemented through cooperative play, and the team members may support each other in emergency situations. The gameplay mode is not limited to the single mode or the duo mode but may include various modes. For example, there may be a gameplay mode where users are divided into three teams (3:3:3) and compete to win the game.

In an embodiment, the game service device 110 may provide a TPS or FPS format game service using a time resource element. The game service relates to a game that makes users pursue the value from time that elapses and time resources (or time energy) to accumulate such time. The game service may be a game in which multiple matched users compete for survival until the time resources (corresponding to their lifespans) of their user characters in the game are exhausted. The users may compete for the time resources corresponding to the lifespans of the user characters in gameplay. The game service enables a fast-paced, fierce battle for the time resources as the lifespans of the user characters gradually decrease. When the gameplay first starts, the user characters may be provided with the same time resource, and the time resource may gradually decrease over time. In the game service, the time resource may be the lifespan of a user character. The user may acquire the time resource during the gameplay and may upgrade the user character's skill through the time resource. In the duo mode, the user may exchange the time resources with their team member and may request the time resource from the team member. The game service device 110 may determine that the last user or team with a remaining time resource (or a remaining lifespan of a user character) has won the gameplay.

Figure 2:
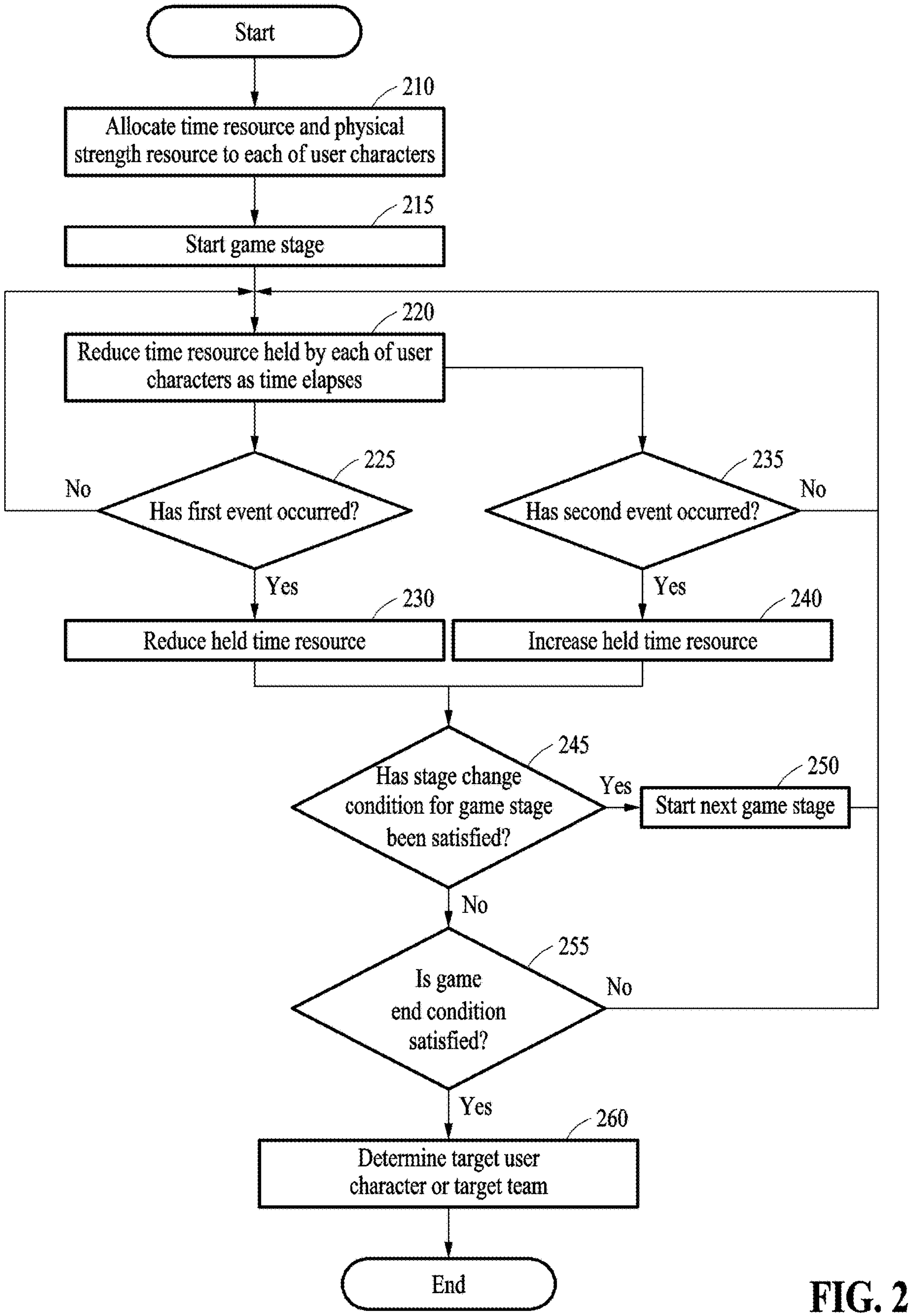
FIG. 2 is a flowchart illustrating operations of a game service method using a time resource element, according to an embodiment.

FIG. 2 is a flowchart illustrating operations of a game service method using a time resource element, according to an embodiment. Some of the operations of FIG. 2 may be performed simultaneously or in parallel to another operation and the order of operations may change. In addition, some of the operations may be omitted or another operation may be additionally performed. The game service method may be performed by a game service device (e.g., the game service device 110 of FIG. 1 or a game service device 1200 of FIG. 12) described herein.

Referring to FIG. 2, in operation 210, the game service device may allocate a time resource and a physical strength resource to each of user characters including a first user character and a second user character. The first user character may be played by a first user, and the second user character may be played by a second user. In this case, the user characters may further include user characters, other than the first user character and the second user character, played by other users, and the number of the user characters is not limited. For example, the game service device may allocate a 5-minute time resource and a 100 of physical strength resource to each of the user characters.

In operation 215, the game service device may start a game stage in a game service. In an embodiment, the game stage may include a plurality of game stages, which start sequentially over time. For example, the game stages may include a first game stage starting at a first time and a second game stage starting at a second time later than the first time. In operation 215, the first game stage may start.

In operation 220, the game service device may reduce the time resource held by each of the user characters as time elapses when the game stage starts. The time resource may be reduced at a rate corresponding to the game stage. The time resources of user characters playing in the same game stage may be reduced at the same rate. As the game stage progresses, a reduction rate gets faster, and thus, the user characters' time resources may be reduced more rapidly. The game service device may reduce the time resources based on a first time reduction rate in the first game stage and may reduce the time resources based on a second time reduction rate faster than the first time reduction rate in the second game stage corresponding to the next game stage of the first game stage.

In operation 225, the game service device may determine whether a first event corresponding to a reduction in a time resource has occurred for the first user character. When at least one first event occurs ('Yes' in operation 225), the game service device may reduce the time resource held by the first user character in operation 230.

In an embodiment, when a first event occurs, in which the physical strength resource of the first user character reaches a first threshold value due to an attack by the second user character, the game service device may reduce the time resource held by the first user character by a preset amount of reduction. For example, when the physical strength resource of the first user character becomes 0 due to an attack by the second user character (or when the first user character dies), the game service device may reduce the time resource held by the first user character by the set amount of reduction. Under the assumption that the time resource held by the first user character is 5 minutes, when the physical strength resource of the first user character reaches the first threshold value due to an attack by the second user character, the time resource of the first user character may be reduced to 3 minutes. When the physical strength resource of the first user character reaches the first threshold due to an attack by the second user character, and the time resource of the first user character is reduced, the time resource of the second user character may increase.

In an embodiment, when the first user character is attacked by the second user character in the game, the game service device may reduce the physical strength resource held by the first user character. The shield resource, physical strength resource, and time resource of the first user character may be sequentially consumed by attacks of other user characters. When the shield resource of the first user character is exhausted, the physical strength resource of the first user character starts to be consumed, and, when the physical strength resource is exhausted, the first user character may be treated as dead.

When the physical strength resource of the first user character reaches the first threshold value (e.g., 0), the game service device may determine whether the time resource of the first user character is greater than a second threshold value (e.g., 0). When the time resource of the first user character is greater than the second threshold value (or when the time resource of the first user character remains), the game service device may determine to respawn the first user character. When the first user character respawns, the first user may continue to play the game from an initial position within a game map through the first user character.

In an embodiment, when a first event occurs in the game stage, in which a purchase selection input for a skill usable by the first user character or an upgrade request input for a skill possessed by the first user character is received, the game service device may reduce the time resource held by the first user character. A user may purchase or upgrade the user character's skill by consuming some of the time resource held by the user character.

In an embodiment, the game service device may deactivate a gameplay of a user character, of the user characters, whose time resource has reached the second threshold value (e.g., 0) until the game ends. When the time resource held by the user character gradually decreases to 0, the user character is treated as completely dead (or eliminated), and the user character's participation in the gameplay may not be allowed until a game end condition is satisfied and the game ends.

In operation 235, the game service device may determine whether a second event corresponding to an increase in a time resource has occurred for the first user character. When at least one second event distinguished from the first event occurs ('Yes' in operation 245), the game service device may increase the time resource held by the first user character in operation 240.

In an embodiment, when a second event occurs, in which the first user character acquires a time resource replenishment item existing on the game map, the game service device may increase the time resource held by the first user character by a time resource corresponding to the acquired time resource replenishment item.

In an embodiment, when a second event occurs, in which the physical strength resource of the second user character reaches the first threshold value (e.g., 0) due to an attack by the first user character, the game service device may increase the time resource held by the first user character. When the physical strength resource of the second user character reaches the first threshold value due to an attack by the first user character, the game service device may determine an amount of increase in the time resource of the first user character based on the time resource held by the second user character and may increase the time resource of the first user character by the determined amount of increase. As the time resource held by the second user character is greater, the amount of increase in the time resource of the first user character increases.

An embodiment where the game is played in a team battle mode (e.g., a duo mode) is described in more detail below.

In an embodiment, user characters in the team battle mode may include the first user character, the second user character, a third user character, and a fourth user character. It is assumed that the first user character and the third user character belong to a first team, and the second user character and the fourth user character belong to a second team distinguished from the first team. When the first user character is positioned within a reference distance from the third user character on the game map, the game service device may control to display a visual object representing that a distance between the first user character and the third user character is within the reference distance on a user terminal. By such a control, for example, the visual object representing that the distance between the first user character and the third user character is within the reference distance may be output in a string shape on a game screen of a user terminal of the first user playing the first user character and a game screen of a user terminal of a third user playing the third user character.

In an embodiment, while the distance between the first user character and the third user character is within the reference distance, when a second event occurs, in which the physical strength resource of the second user character or the fourth user character reaches the first threshold value (e.g., 0) by an attack by the third user character, the game service device may increase the time resource held by the first user character.

In an embodiment, while the distance between the first user character and the third user character is within the reference distance, when a second event occurs, in which the third user character acquires a time resource replenishment item existing on the game map, the game service device may increase the time resource held by the first user character.

In an embodiment, the first user character may request the transmission of the time resource to the third user character in the same team. In response to the time resource transmission request from the first user character to the third user character, when receiving a user input (e.g., a user input corresponding to the acceptance of the time resource transmission request) corresponding to a preset reference input from the user terminal of the third user character, the game service device may add at least a portion of the time resource held by the third user character to the time resource held by the first user character. For example, when the time resource transmission request is accepted, the time resource corresponding to 1 minute may be deducted from the time resource held by the third user character, and the time resource held by the first user character may be increased by 1 minute.

In operation 245, the game service device may determine whether a stage change condition for the game stage has been satisfied. For example, when a time allocated to the game stage that was being played has elapsed, the stage change condition may be determined to be satisfied.

When the stage change condition is determined to be satisfied (determined to be 'Yes' in operation 245), the game service device may start the next game stage in operation 250. If the first game stage has been played before, the second game stage may start in operation 250. Then, the operation may return to operation 220, and the operations after operation 215 may be restarted. In the second game stage, the time resources of the user characters may decrease at a faster rate than in the first game stage.

When the stage change condition is determined to be unsatisfied (determined to be 'No' in operation 245), the game service device may determine whether the game end condition is satisfied in operation 255. For example, when only the last user character with a remaining time resource remains in a single mode, only one team with a remaining time resource remains in the duo mode, all the set time is up, or the set game stage has been completed, the game end condition is determined to be satisfied. When the game end condition is determined to be unsatisfied ('No' in operation 255), the operation may return to operation 220 and the operations after operation 215 may be restarted.

When the game end condition is determined to be satisfied ('Yes' in operation 255), the game service device may determine a target user character (when the game mode is the single mode) corresponding to a game winner or a target team (when the game mode is the duo mode) corresponding to a game winning team in operation 260.

In an embodiment, the game service device may determine the target user character who wins the game based on the time resources held by the user characters. For example, when the first user character of the user characters is the only user character with a remaining time resource, the game service device may determine the first user character as the target user character. For another example, when the set time has elapsed, the game service device may determine the user character with the greatest time resource of the time resources respectively held by the user characters as the target user character.

In the team battle mode, the game service device may determine the target team that wins the game based on the time resources held by the user characters. For example, when the first team of teams including one or more user characters is the only team including a user character with a remaining time resource, the game service device may determine the first team as the target team.

Figure 3:
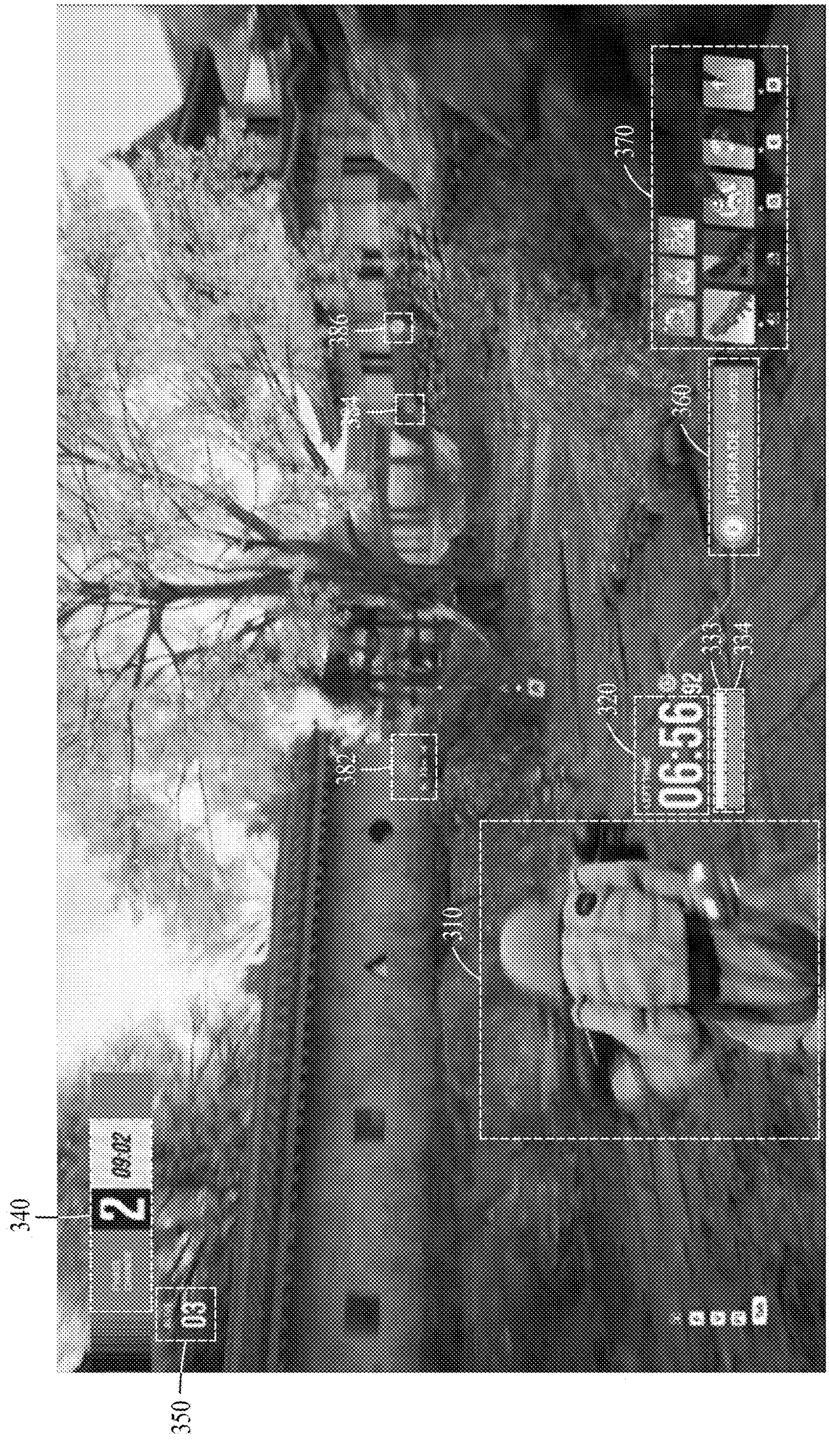
FIG. 3 is a diagram illustrating a game screen provided through a game service, according to an embodiment.

FIG. 3 is a diagram illustrating a game screen provided through a game service, according to an embodiment.

FIG. 3 illustrates an example of the game screen output on a display of a user terminal when a user plays a game through a user character 310. In an embodiment, the user character 310, a visual object 320 representing a time resource of the user character 310, a visual object 333 representing a shield resource of the user character 310, a visual object 334 representing a physical strength resource of the user character 310, and a visual object 370 representing information on a skill possessed by the user character 310 may be output on the game screen. The visual object 370 may represent a purchase (installation) of a skill or an upgrade of a skill.

A visual object 340 representing a current game stage and a remaining time, a visual object 350 representing the number of user characters surviving in the game, and a visual object 360 related to an upgrade of a skill may be further output on the game screen. In addition, visual objects 382, 384, and 386 representing a position/direction where a time resource replenishment item is on a game map may be further output on the game screen. The visual objects 382, 384, and 386 may include a distance value from the user character 310 to a position of each of time resource replenishment items. The visual objects 382, 384, and 386 may be displayed when a scan function is activated for a time resource replenishment item as described below. When the user character 310 acquires a time resource replenishment item, the time resource held by the user character 310 may increase. The time resource replenishment items may be generated in a random or designated position on the game map.

The user character 310 has various stats, and the number of stats may be increased or decreased through skills or the like.

The time resource of the user character 310 serves the same role as a lifespan of the user character 310. A time resource may be periodically deducted over time during a gameplay. A deduction speed of a time resource may be accelerated along the progress of a game stage. When the time resource is 0, and the physical strength resource decreases to 0, the user character 310 is treated as dead. As the game stage progresses, the deduction speed of a time resource may increase. When the user character 310 is treated as dead, the user character 310 may be no longer permitted to participate in an ongoing gameplay until the ongoing gameplay ends and a target user character or a target team corresponding to a game winner is determined.

In an embodiment, the time resource of the user character 310 may be used to purchase or upgrade weapons and/or skills usable by the user character 310 in an in-game store. When the time resource held by the user character 310 is less than the time resource required to purchase or upgrade the weapons and/or skills in the store, a guide message that notifies the time resource is insufficient may be output on the game screen.

When a game mode is a team battle, the user character 310 may request the transmission of a time resource to another user character in the same team. When the other user character approves the transmission of the time resource, the time resource of the user character 310 may be increased by the time resource transmitted by the other user character. A maximum amount of the time resource that the user character 310 may accumulate may be limited to a certain value.

In an embodiment, the user character 310 may revive or respawn even if the user character 310 dies due to an attack by another user character or a non-player character (NPC) unless the time resource becomes 0. A certain amount of the time resource may be spent when participating in the gameplay again after reviving or respawning. When the user character 310 is killed by another user character, a fixed time resource (e.g., 1 minute) and a deduction amount (e.g., 30% of the time resource held by the user character 310) proportional to the time resource held by the user character 310 may be deducted from the time resource held by the user character 310. Accordingly, as the time resource held by the user character 310 is greater, the deduction amount may increase. When the time resource becomes 0 when the user character 310 dies, the user character 310 may not revive or respawn.

In an embodiment, each user character may initially start a gameplay with a certain amount of a shield resource and a physical strength resource. When the user character is attacked, the shield resource is first deducted, and all the shield resource is consumed, the physical strength resource may start to be deducted. The shield resource may automatically gradually recover after a certain time. When the user character is attacked during the recovery of the shield resource, an automatic recovery function may be stopped. The total amount of a shield resource, a recovery speed, and/or a recovery amount may vary depending on the types of user characters, and the maximum amount of the shield resource may be increased through a skill. In addition, the total amount of a physical strength resource and/or a recovery amount may vary depending on the types of user characters, and the maximum amount of the physical strength resource may be increased through a skill.

In an embodiment, an artificial intelligence assistant function may be provided in a game service. Through the artificial intelligence assistant function, various guides and/or suggestions related to a gameplay may be provided to a user through text or voice.

Figure 4:
FIG. 4 is a diagram illustrating a game screen where a time resource replenishment item appears, according to an embodiment.

FIG. 4 is a diagram illustrating a game screen where a time resource replenishment item appears, according to an embodiment.

FIG. 4 illustrates the game screen when the user character 410 nears a visual object 420 representing a time resource replenishment item. A visual object 430 representing a time resource held by the user character 410 is displayed on the game screen.

In a gameplay, a plurality of users may compete for survival until all the time resources (corresponding to lifespans) of their own user characters are exhausted. When all the lifespans of the other user characters (or the other teams), excluding one user character (or one team), are exhausted, a game may end. The time resources of the user characters may be continuously consumed after the game starts. The time resources may be consumed at a faster rate as a game stage advances.

The user character 410 may extend its lifespan by acquiring a time resource replenishment item. The number of time resource replenishment items spawning on a game map may be determined depending on game stages (or game phases) and the number may gradually decrease or maintain depending on the game stages. When the user character 410 acquires a time resource replenishment item, the time resource of the user character 410 may be increased by a time resource corresponding to the time resource replenishment item. An increased amount of the time resource according to the acquisition of the time resource replenishment item may vary depending on the type of the time resource replenishment item.

In an embodiment, the time resource replenishment items may be at various positions on the game map. The time resource replenishment items may be (or spawn) at predesignated positions or randomly determined positions on the game map when the gameplay initially starts. The time resource replenishment items may be regenerated when a game stage changes and may be on the game map. In an embodiment, a region where the time resource replenishment items are on the game map may be narrower as the game stage advances. For example, in a first game stage, the time resource replenishment items are in the whole region of the game map, but, in the next game stage of the first game stage, the time resource replenishment items may be in a region smaller than the region where the time resource replenishment items previously have been. In each game stage, the size of a region where the time resource replenishment items may be and the number (or the number of spawning points, which are positions where the time resource replenishment items spawn) of the time resource replenishment items may be adjusted.

In an embodiment, a user may use a scan function for time resource replenishment items by inputting a certain key. When the scan function is used, the positions of time resource replenishment items in a certain region set based on the user character 410 in the game map may be identified and displayed. When the scan function is used, the time resource replenishment items positioned in the certain region in the game screen may be projected and displayed. The scanned time resource replenishment items may be displayed on the game screen as visual objects (e.g., visual objects 382, 384, and 386 of FIG. 3) corresponding to markers and as distances from a user character to the scanned time resource replenishment items on the game map. The visual objects corresponding to the markers may be displayed in different shapes depending on replenishment amounts of time resources provided by the time resource replenishment items, and the size of the visual objects may be differently displayed depending on the distances from the user character to the scanned time resource replenishment items. For example, the size of the visual objects may be displayed more largely or clearly as the distances from the user character to the scanned time resource replenishment items are closer.

In an embodiment, the user may use a marking function to mark the time resource replenishment items. While using the scan function for time resource replenishment items, the user may focus on the scanned time resource replenishment items through aiming and may mark the focused time resource replenishment items by inputting a certain key. When a time resource replenishment item is marked, a navigation object for guiding a path to the position of the marked time resource replenishment item may be provided through the game screen. When the marked time resource replenishment item disappears because another user character acquires the marked time resource replenishment item or a game stage changes, the marking and the navigation object are no longer displayed.

Figure 5:
FIG. 5 is a diagram illustrating an increase of a time resource of a user character, according to an embodiment.

FIG. 5 is a diagram illustrating an increase of a time resource of a user character, according to an embodiment.

A user may extend their own time resource by taking a portion of or all the time resource by killing a user character of another user or an NPC. For example, when the user character kills the other user character (e.g., when all the shield resource and physical strength resource of the other user character are exhausted by an attack), the user character may increase the time resource held by the user character by acquiring a portion of the time resource having been held by the other user character. In addition, the user character may acquire the time resource by killing an NPC appearing on a game map. When a time resource is acquired, as illustrated in a game screen of FIG. 5, a visual object 520 representing an increased amount of the time resource and a visual object 510 corresponding to a time resource increased by the increased amount may be displayed.

In an embodiment, when the time resource of the user character may be increased or decreased by achieving a certain condition, through which path what amount of a time resource is increased or decreased may be displayed on the game screen. When the time resource is increased, an increased amount of the time resource may be marked as a + sign, and, when the time resource is decreased, a decreased amount of the time resource may be marked as a − sign.

In an embodiment, when a physical strength resource of a second user character becomes 0 as a first user character attacks the second user character, and a time resource, decreased by death, of the second user character is greater than 0, it may be classified as 'killed', and, when the time resource is less than or equal to 0, it may be classified as 'completely killed'. When classified as 'killed', the second user character may revive after a dash time for respawning and may participate in the game again. When classified as 'completely killed', the second user character may not revive and may not participate in the game again.

In an embodiment, when the second user character is killed by an attack by the first user character, and the first user character having killed the second user character appears on the game screen of a user playing the second user character, a certain mark or icon may be displayed around the first user character. The user may identify which user character kills the second user character played by the user through the mark or icon. When the second user character attacks the first user character, and the first user character is killed or completely killed, the mark or icon displayed around the first user character may be deleted.

In an embodiment, during a game stage, when a time resource of a user character becomes 0, a physical strength resource of the user character may decrease by a designated amount per second. When the physical strength resource decreases to 0, the user character is treated the same as completely killed and may no longer participate in the game.

Figure 6:
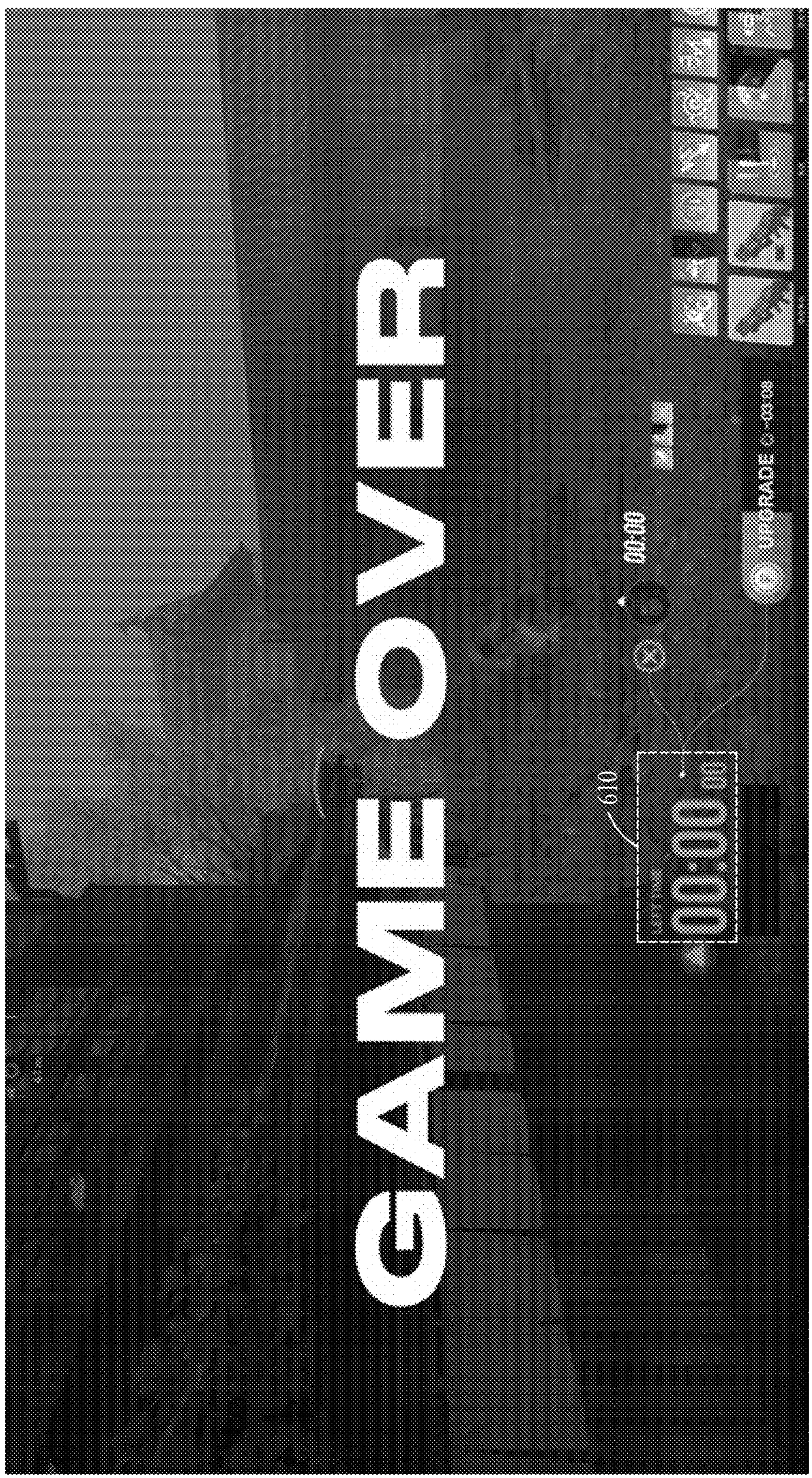
FIG. 6 is a diagram illustrating a game screen when a time resource reaches a threshold value, according to an embodiment.

FIG. 6 is a diagram illustrating a game screen when a time resource reaches a threshold value, according to an embodiment.

When a first user character is attacked by a second user character, a shield resource of the first user character starts to be consumed, and, when the shield resource of the first user character is exhausted, a physical strength resource may start to be consumed. When the physical strength resource of the first user character reaches 0, the first user character is treated as dead, and a time resource of the first user character may be deducted according to a set rule. When the time resource, remaining after the deduction of the time resource, of the first user character is greater than 0, the first user character respawns and may continue to participate in a gameplay. When the first user character is determined to respawn, a respawn wait screen may be displayed on a user terminal. Another user character having killed the first user character and an amount of a time resource taken by the other user character having killed the first user character may be displayed on the respawn wait screen. In a team battle, a game screen of another team member may be displayed through the respawn wait screen, and a respawn wait time may be provided through the game screen of the other team member.

When the time resource, remaining after the deduction of the time resource, of the first user character is less than or equal to 0, as illustrated in FIG. 6, a game screen representing an end of the gameplay together with a visual object 610 representing the time resource being 0 may be output. In this case, the gameplay of the first user character is deactivated until the end of the game, and the participation of the first user character in the gameplay may not be permitted.

In an embodiment, a target user character or a target team that wins the game may be determined based on time resources held by user characters. For example, a final user character or team with a remaining time resource may be determined to be a final winner. Alternatively, when a certain gameplay time has passed, a user character having the largest time resource is determined to be a final winner, and a resultant ranking of the gameplay may be determined depending on the amount of remaining time resources.

Figure 7:
FIG. 7 is a diagram illustrating a change of a game stage, according to an embodiment.
Figure 7:

FIG. 7 is a diagram illustrating a change of a game stage, according to an embodiment.

Game stages (or phases) of a game service may change over time. Whenever the game stages are switched, the number of time resource replenishment items spawning on a game map may decrease, and a reduction rate of a time resource (corresponding to a time energy) of each user character may increase. As a game stage progresses, the time resource may be reduced at a set rate per second.

The game stages may include N (a natural number greater than or equal to 1) stages, but examples are not limited thereto. The game stages are sequentially played, and there may be a condition for the switching of the game stages. There may be a minimum time for which a game stage is switched, and, when the set minimum time elapses, the game stage may be changed to the next game stage. In addition, when the number of user characters surviving in the current game stage is less than or equal to a set number, the game stage may be switched to the next game stage. A bonus time resource may be provided to the user characters (the remaining user characters that are not completely killed) surviving whenever the game stages are switched. When the game stage is switched to the next game stage, a time resource held by each user character may be increased by a predefined amount. The amount of the increased time resource may be the same or different every time the game stages are switched. For example, as the game stage advances, the amount of the increased time resource may gradually decrease.

In an embodiment, when the game stages include a total of 5, each game stage from a first game stage to a fourth game stage is maintained during a certain time, and a final fifth game stage may be played until a target user character (or a target team) corresponding to a game winner is determined without a separate time limit.

When the gameplay first starts, the first game stage starts, and, when a time corresponding to the first game stage has elapsed, the second game stage may start. In this case, as shown in a game screen 710 of FIG. 7, guide content 715 to notify the start of the second game stage (PHASE 02) may be output through user terminals of all users participating in the game. Then, as shown in a game screen 720, a visual object 725 representing the remaining time and a current game stage may represent the current game stage corresponding to the second game stage and the remaining time until the second game stage ends. Information on the number of the user characters surviving in the current game stage near the visual object 725 may be provided.

Figure 8:
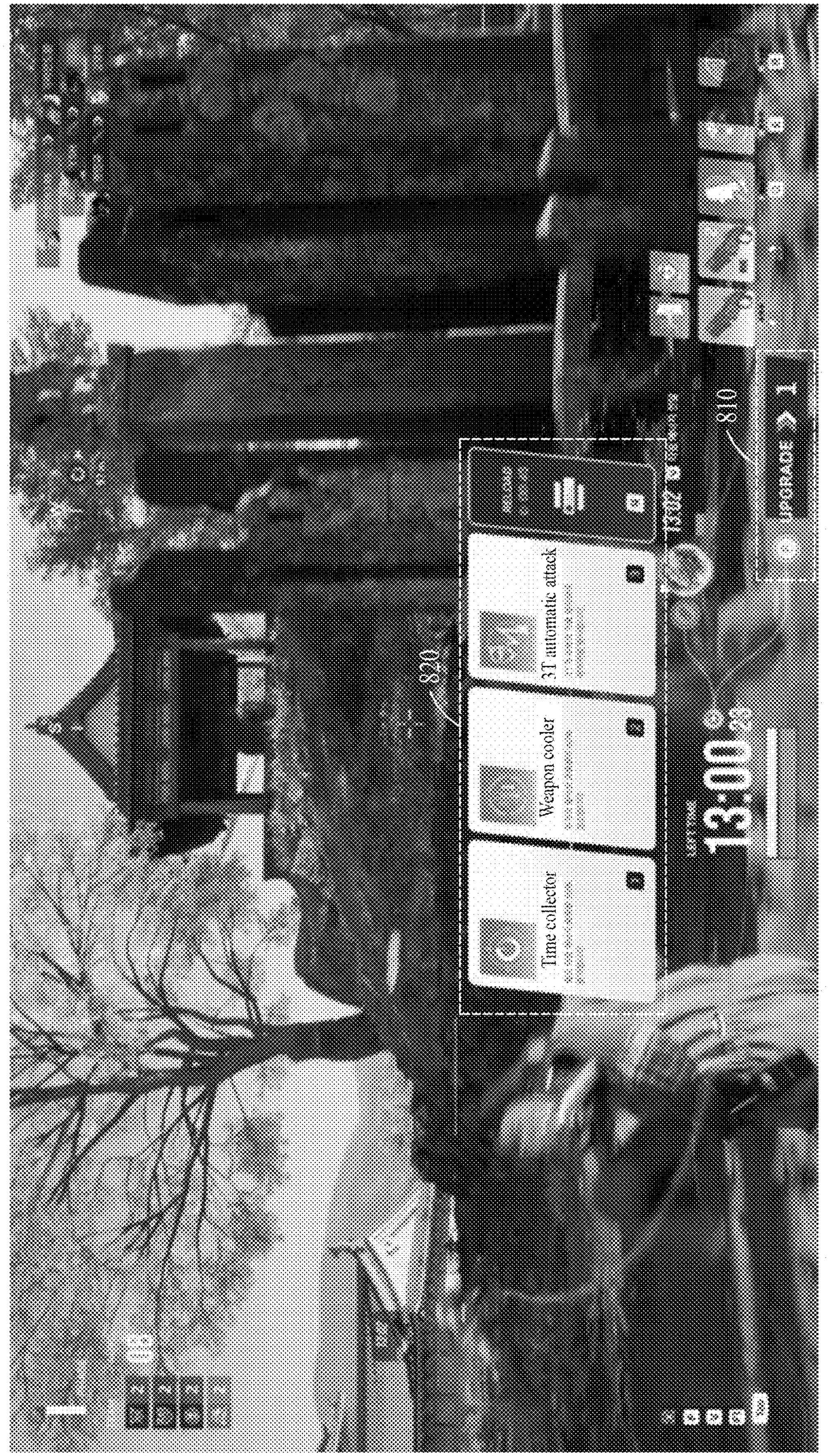
FIG. 8 is a diagram illustrating a skill purchase by a user character, according to an embodiment.

FIG. 8 is a diagram illustrating a skill purchase by a user character, according to an embodiment.

The user character may purchase (install) or upgrade weapons and/or skills usable by the user character in an in-game store based on a time resource held by the user character. Referring to FIG. 8, a user may activate the in-game store by pressing a certain key (e.g., an F key) according to a visual object 810 displayed on a game screen. The visual object 810 may show a current market gauge and information on the number (corresponding to skill points) of skills that may be purchased or upgraded. The user character may fill the market gauge by acquiring a time resource replenishment item in the game, killing another user character, or consuming a remaining time resource and may acquire skill points by filling the market gauge. The skill points may be required to use the in-game store.

When the in-game store is activated, a visual object 820 representing skills that may be purchased or upgraded may be provided through a game screen. The user may select a skill to be purchased or upgraded by inputting a certain numeric key in the order shown in the visual object 820. The user may build their own game-winning strategy by purchasing or upgrading skills. When reloading a skill list shown in the visual object 820, a certain amount of a time resource may be consumed.

When the user wants to use the in-game store without having skill points, the user may fill the skill points by consuming the time resource held by the user character. To charge skill points, a time resource proportional to an insufficient amount in the market gauge may be consumed.

In an embodiment, the skills of the user character may be divided into unique skills, utility skills, and passive skills. Because the acquisition method and effect of each skill are different, various gameplay may be possible through a combination of skills and the use of various user characters. The user may activate a skill through a certain key input.

The unique skills may be skills unique to the type of each user character and may be skills unchangeable during the gameplay. The utility skills may be skills directly used by the user after purchasing the skills. In an embodiment, the user may proceed with the gameplay by selecting a certain number (e.g., 2) of utility skills before the game starts, and the selected utility skills may be upgraded through the in-game store during the gameplay. The passive skills may be skills whose effects persist or are indirectly activated once the user character acquires the skills and may be acquired through the in-game store. The passive skills may be used without a separate input because the effects of skills are persistently applied to the user character.

Figure 9A:
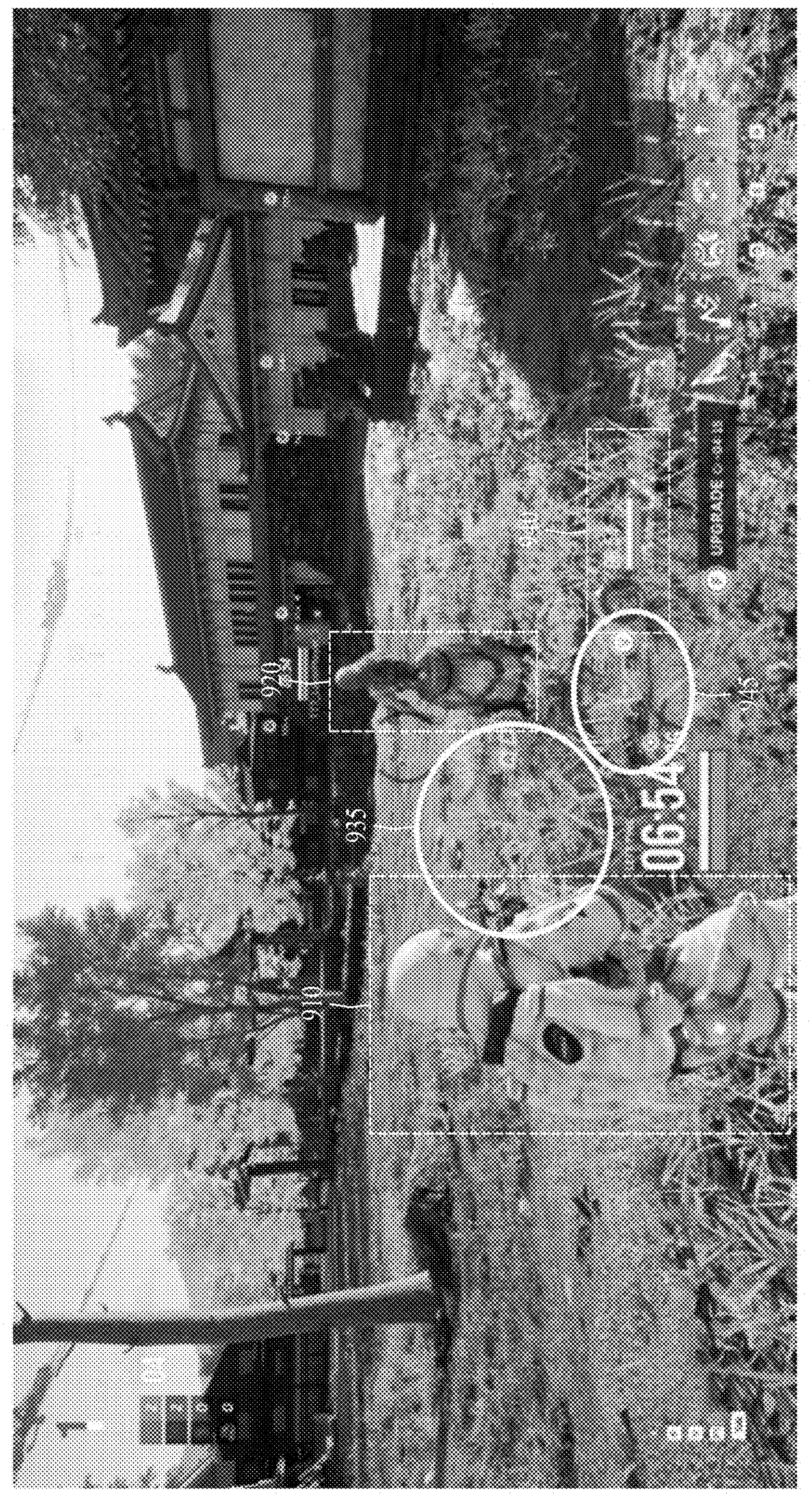
FIGS. 9A and 9B are diagrams each illustrating a game screen in a team battle mode, according to an embodiment.
Figure 9B:
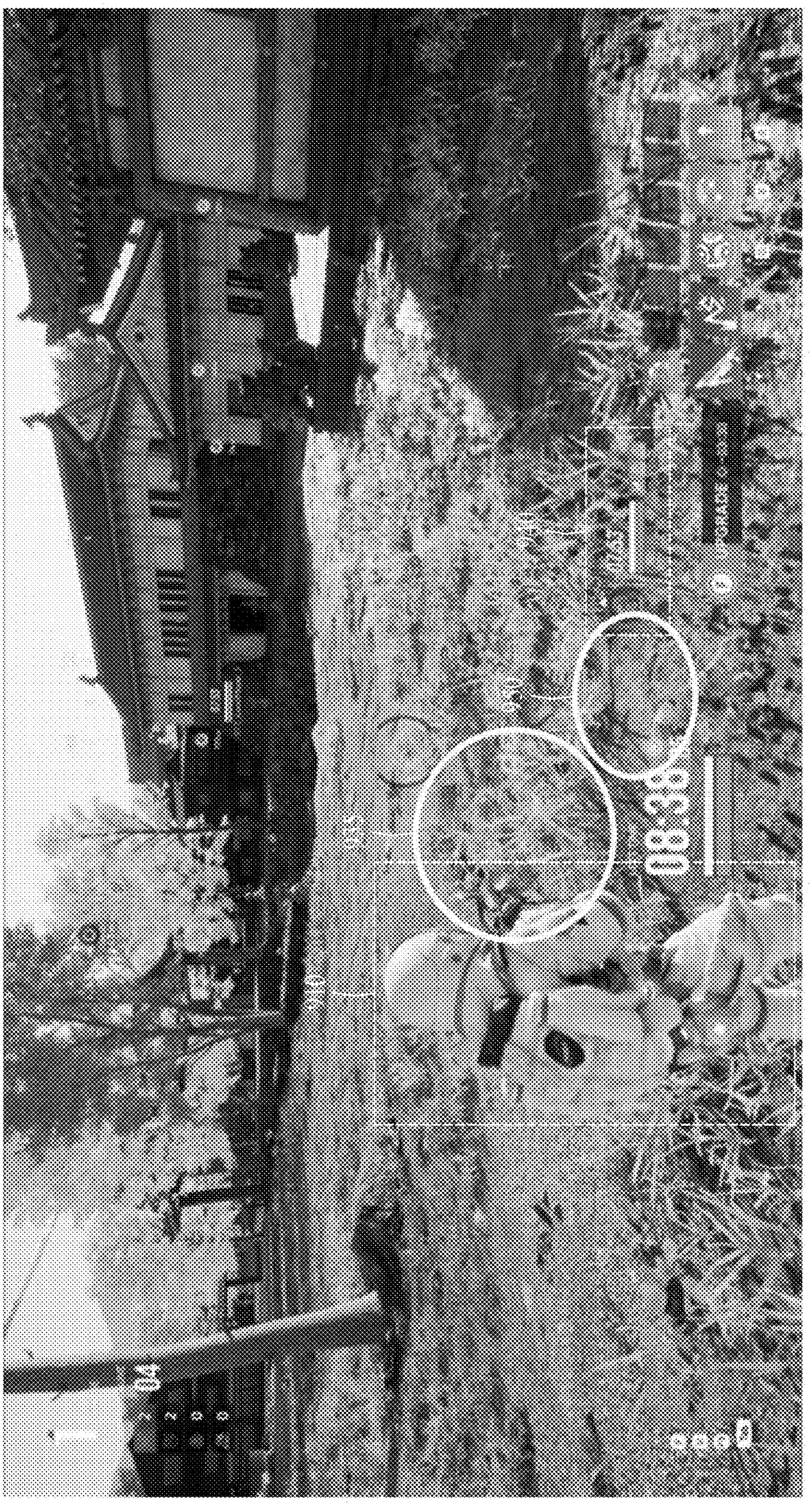

FIGS. 9A and 9B are diagrams each illustrating a game screen in a team battle mode, according to an embodiment.

Referring to FIG. 9A, when a user character 910 is with a user character (a team member) 920 in the same team within a certain radius in a team battle mode, a link is established between the user character 910 and the user character 920, and a visual object 935 representing the link may be displayed on a game screen. In addition, on the game screen, a visual object 940 representing the state information of the user character 920 may be displayed, and a visual object 945 representing the establishment of the link between the user character 910 and the user character 920 may be displayed. The visual object 945 may be expressed, for example, by a blue line.

When a distance between the user character 910 and the user character 920 becomes greater than or equal to a certain radius, the link having been established between the user character 910 and the user character 920 may be cut. In this case, as illustrated in FIG. 9B, the visual object 935 representing the link disappears from the game screen. The visual object 945 switches to a visual object 950 representing that the link with the user character 920 has been cut and the visual object 950 may be displayed. The visual object 945 may be expressed, for example, by a red line.

The user character 910 may get various advantageous effects when the user character 920 in the same team is within a certain distance. For example, while the link between the user character 910 and the user character 920 has been established, when the user character 910 acquires a time resource replenishment item, the user character 920 in the same team may also be provided with an additional time resource according to the acquisition of the time resource replenishment item. For example, both the user character 910 and the user character 920 may be provided with a 100% of a time resource replenishment amount provided by the time resource replenishment item.

In an embodiment, while the link between the user character 910 and the user character 920 has been established, when the user character 910 kills a user character in another team, the user character 920 may also be provided with an additional time resource according to the killing of the user character in the other team. For example, the user character 920 may be provided with 50% of the additional time resource provided by the user character 910's killing of the user character in the other team.

In an embodiment, while the link between the user character 910 and the user character 920 has been established, when the user character 910 kills an NPC on a game map, the user character 920 may also be provided with an additional time resource according to the killing of the NPC. For example, the user character 920 may be provided with the same additional time resource provided by the user character 910's killing of the NPC.

In an embodiment, while the link between the user character 910 and the user character 920 has been established, the user character 910 and the user character 920 may share time resources. While the link has been established, the user character 910 may transmit a portion of the time resource held by the user character 910 to the user character 920. While a link has been established, through a function of transmitting time resources between allies, a user character may help their allies at risk of being out from a gameplay or may reduce the possibility of being out from the gameplay.

The user character 910 may transmit the time resource to the user character 920 only when the time resource held by the user character 910 is greater than or equal to a certain value. When the time resource held by the user character 910 is greater than or equal to a certain value, and a user playing the user character 910 inputs a certain key, the time resource held by the user character 910 may start to be transmitted to the user character 920 at a constant pace. Accordingly, the time resource held by the user character 920 may gradually increase. When the link between the user character 910 and the user character 920 is cut, the transmission of the time resource may be stopped. The user character 910 may request the transmission of the time resource held by the user character 920 to the user character 920, which is a member of the same team.

As described above, since the user character 910 may be provided with various advantageous effects when establishing a link with the user character 920, users respectively playing the user character 910 and the user character 920 are more likely to play cooperatively rather than separately. By doing so, the users respectively playing the user character 910 and the user character 920 may enjoy the fun of the game through communication during the cooperative play and strategic thinking and the creation of variables through the cooperative play.

Figure 10A:
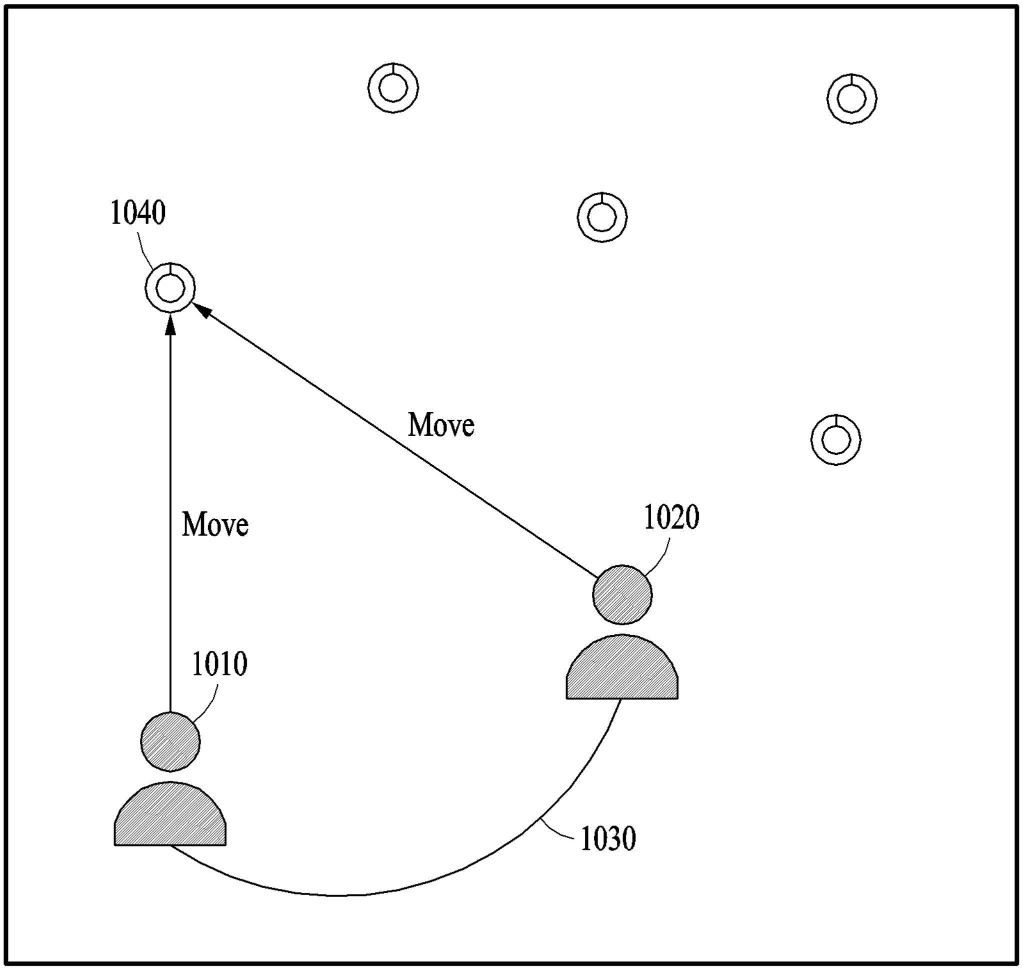
FIGS. 10A, 10B, and 10C are diagrams each illustrating a gameplay method in a team battle mode, according to an embodiment.
Figure 10B:
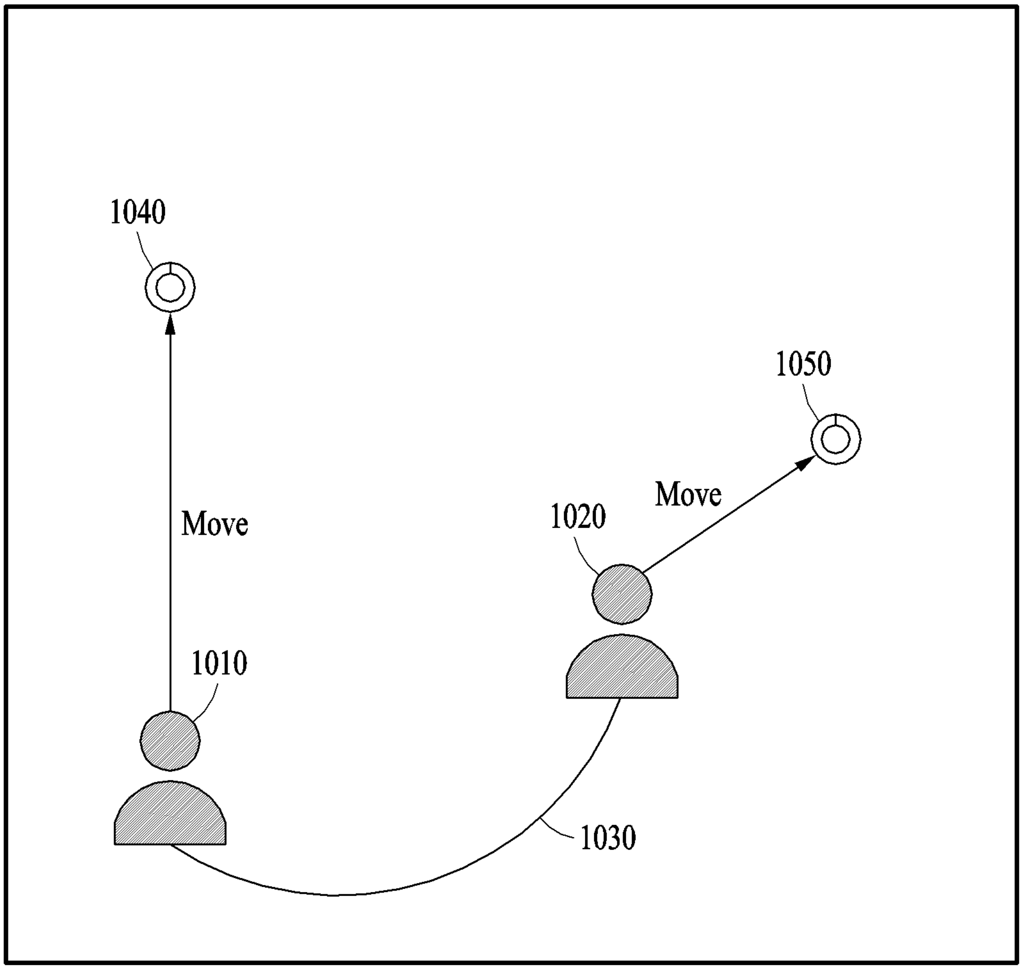
Figure 10C:
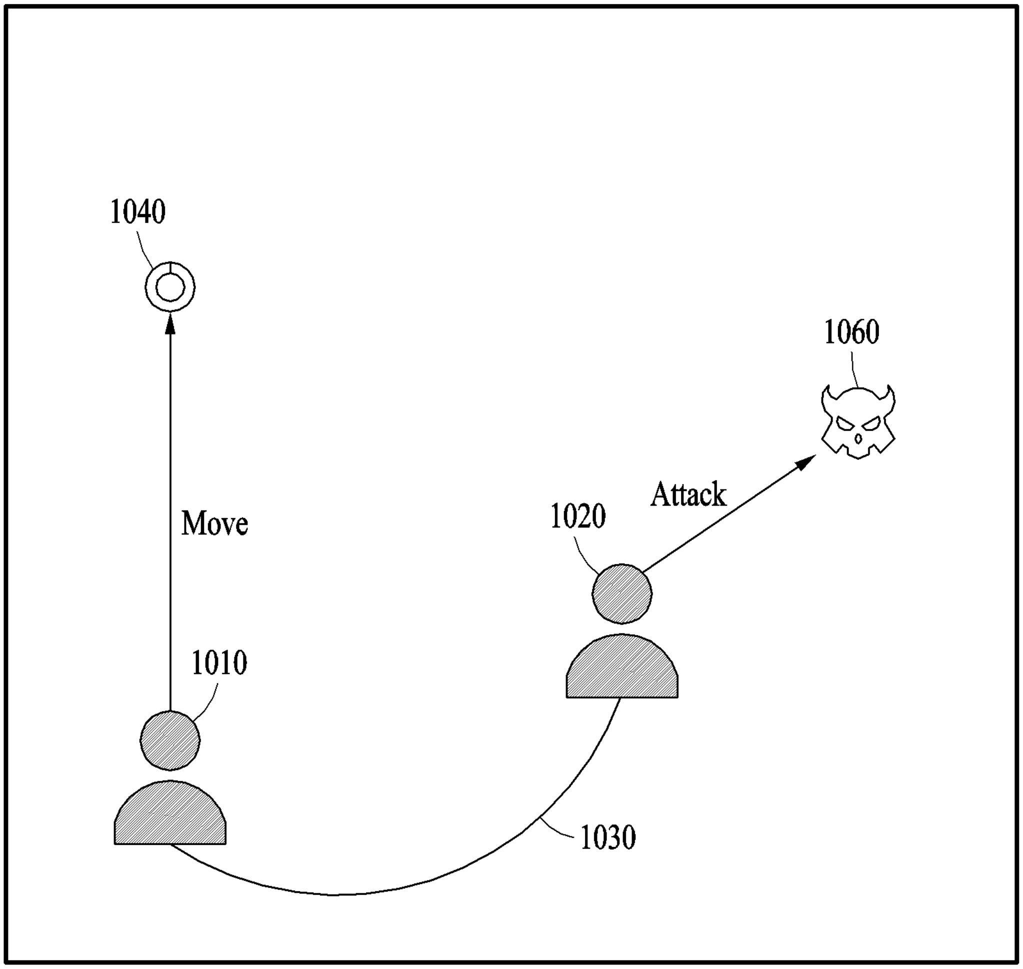

FIGS. 10A, 10B, and 10C are diagrams each illustrating a gameplay method in a team battle mode, according to an embodiment.

Hereinafter, it is assumed that a user character 1010 of a first user and a user character 1020 of a second user belong to the same team in the team battle mode in a game service. When the user character 1010 and the user character 1020 are within a certain distance, a link 1030 is established between the user character 1010 and the user character 1020, and the established link 1030 may be displayed on game screens respectively provided to the first user and the second user. The establishment of the link 1030 may represent a conceptual state in which at least two allies are connected within a certain distance.

For example, as illustrated in FIG. 10A, the link 1030 is established between the user character 1010 and the user character 1020, and, while the link 1030 is maintained, there is no loss even when any of them goes to acquire one time resource replenishment item 1040. In addition, as illustrated in FIG. 10B, the user character 1010 and the user character 1020 may respectively go to acquire different time resource replenishment items 1040 and 1050 while maintaining the link 1030. While maintaining the link 1030, the user character 1010 may move to acquire the time resource replenishment item 1040, and the user character 1020 may move to acquire the time resource replenishment item 1050. In addition, as illustrated in FIG. 10C, while maintaining the link 1030 between the user character 1010 and the user character 1020, the user character 1010 may move to acquire the time resource replenishment item 1040, and the user character 1020 may attack a user character in another team or an NPC 1060. As such, various gameplay strategies using the link 1030 may be possible.

Figure 11A:
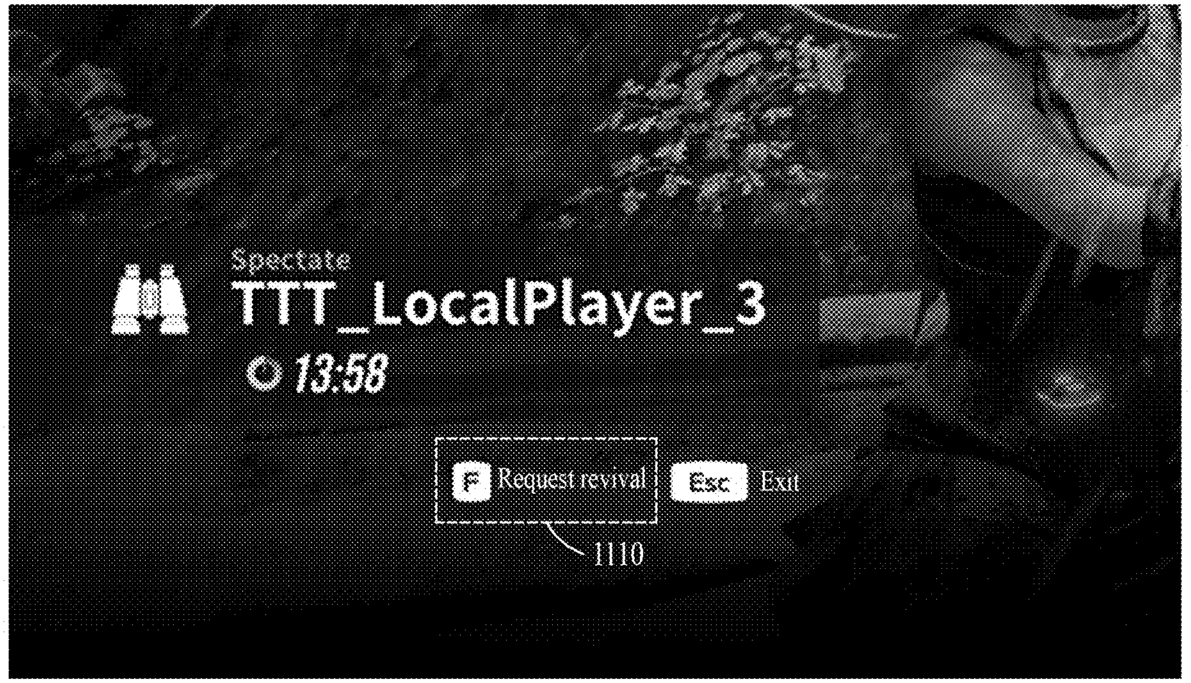
FIGS. 11A, 11B, and 11C are diagrams each illustrating a revival request of a team member in a team battle mode, according to an embodiment.
Figure 11B:
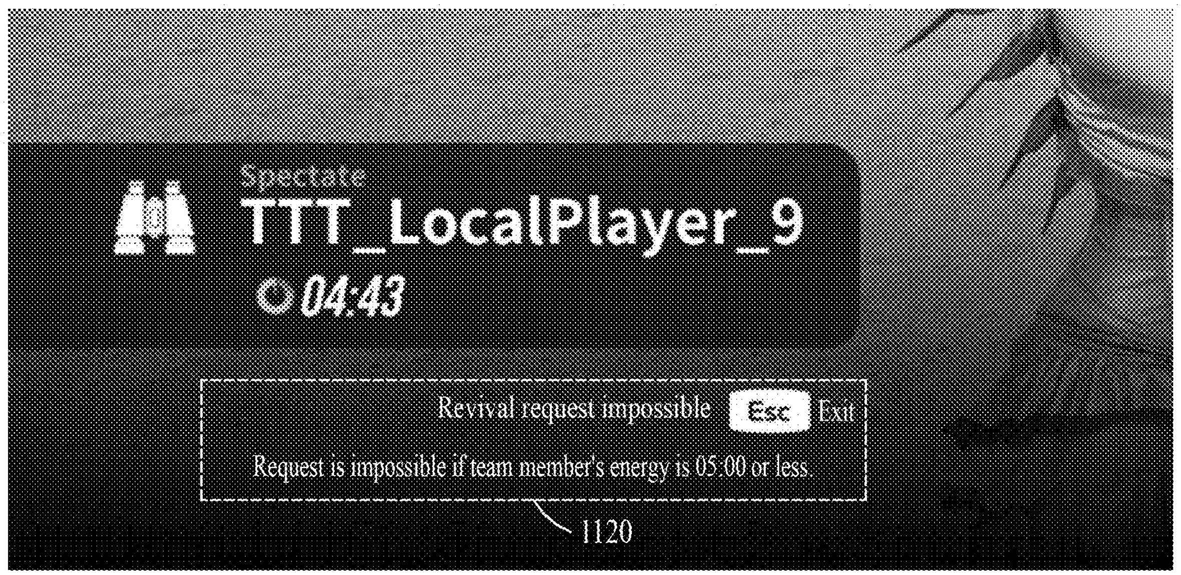
Figure 11C:
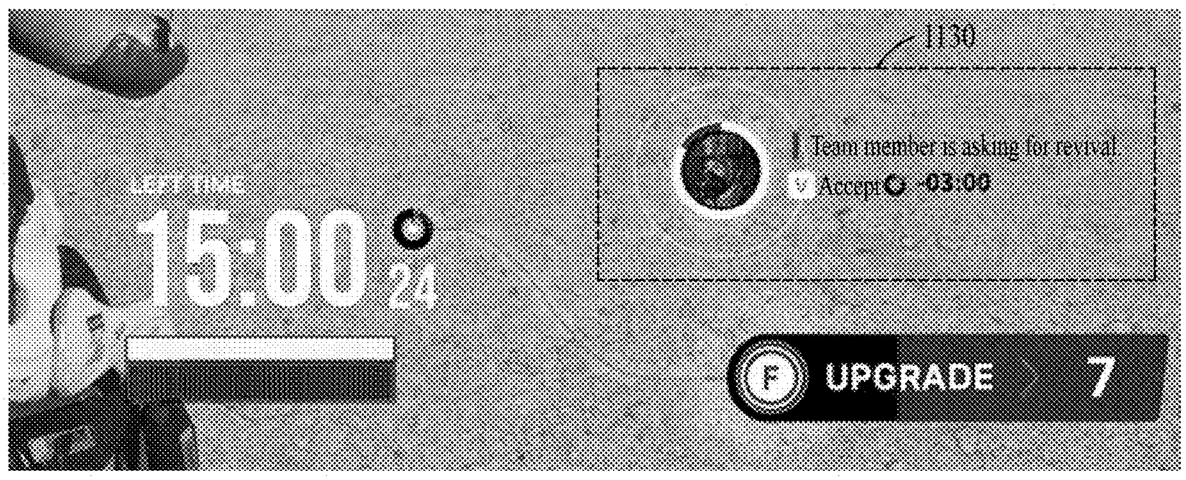

FIGS. 11A, 11B, and 11C are diagrams each illustrating a revival request of a team member in a team battle mode, according to an embodiment.

Referring to FIG. 11A, when a first user character is killed in the team battle mode and into an ally spectator mode, a visual object 1110 representing a revival request function may be displayed on a game screen of a user playing the first user character. When the first user character is out of the game, if a second user character in the same team survives, the first user character may request revival from a user playing the second user character. The user playing the first user character may request revival from the user playing the second user character in the same team by inputting a certain key. However, when a time resource held by the second user character is greater than a certain value (e.g., 5 minutes), the visual object 1110 may be displayed on the game screen. When the time resource held by the second user character is less than or equal to a certain value (e.g., 5 minutes), as illustrated in FIG. 11B, a visual object 1120 representing the revival request is impossible may be displayed on the game screen of the user playing the first user character.

When the time resource held by the second user character is greater than a certain value (e.g., 5 minutes), and the user playing the first user character requests revival from the user playing the second user character, and, as illustrated in FIG. 11C, a visual object 1130 representing that the revival request is received may be displayed on the game screen of the user playing the second user character. The user playing the second user character may accept the revival request by entering a certain key. When accepting the revival request, a certain amount (e.g., 3 minutes) of time resource is deducted from the time resource held by the second user character, and the first user character may revive with a set amount (e.g., 2.5 minutes) of time resource and may play the game again.

Figure 12:
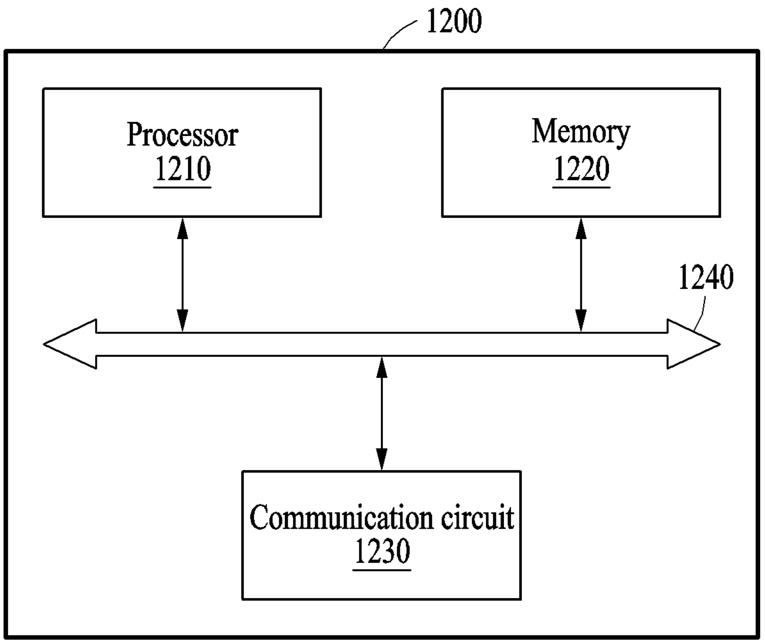
FIG. 12 is a block diagram illustrating a configuration of a game service device according to an embodiment.

FIG. 12 is a block diagram illustrating a configuration of a game service device according to an embodiment.

Figure 13:
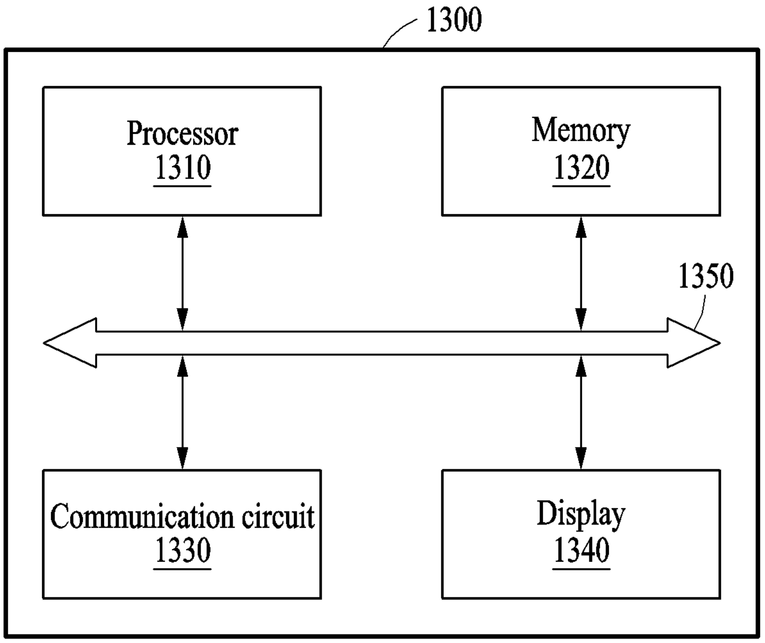
FIG. 13 is a block diagram illustrating a configuration of a user terminal according to an embodiment.

Referring to FIG. 12, a game service device 1200 may be a device for providing a game service to one or more user terminals (e.g., a user terminal 1300 of FIG. 13). The game service device 1200 may correspond to the game service device (e.g., the game service device 110 of FIG. 1) described herein.

The game service device 1200 may include a processor 1210, a memory 1220, a communication circuit 1230, and a communication bus 1240. Components of the game service device 1200 may communicate with one another through the communication bus 1240. In an embodiment, some of the components may be omitted from the game service device 1200, or another component may be added to the game service device 1200.

The processor 1210 may control other components (e.g., hardware or software components) of the game service device 1200 and may perform various types of data processing or operations. In an embodiment, as at least a part of data processing or operations, the processor 1210 may store instructions or data received from another component in the memory 1220, may process the instructions or the data stored in the memory 1220, and may store the resulting data in the memory 1220.

The processor 1210 may include a main processor (e.g., a central processing unit (CPU) or an application processor (AP)) or an auxiliary processor (e.g., a graphics processing unit (GPU), a neural processing unit (NPU), an image signal processor (ISP), a sensor hub processor, or a communication processor (CP)) that is operable independently of or in conjunction with the main processor.

The memory 1220 may store various pieces of data used by the components (e.g., the processor 1210 or the communication circuit 1230) of the game service device 1200. The various pieces of data may include, for example, a game service control program, input data or output data for the instructions related thereto, and log data. The memory 1220 may store one or more instructions executable by the processor 1210. The memory 1220 may include a volatile memory or a non-volatile memory.

The communication circuit 1230 may support establishing a direct (e.g., wired) or wireless communication channel between the game service device 1200 and another device (e.g., a user terminal) and may support communication through the established communication channel. For example, the communication circuit 1230 may receive play data related to a gameplay from a user terminal and may transmit control data related to the game service to the user terminal. The communication circuit 1230 may include a communication circuit for performing a communication function. The communication circuit 1230 may include a CP that operates independently of the processor 1210 and supports direct (e.g., wired) or wireless communication. The communication circuit 1230 may include a wireless communication circuit (e.g., a Bluetooth™ communication circuit, a cellular communication circuit, a Wi-Fi communication circuit, or a global navigation satellite system (GNSS) communication circuit) that performs wireless communication or a wired communication circuit (e.g., a local area network (LAN) communication circuit or a power line communication (PLC) circuit).

In an embodiment, the game service device 1200 may include the communication circuit 1230 for communication with user terminals that manipulate each of user characters including a first user character and a second user character, one or more processors 1210 that control the game service according to the manipulation of each of the user characters, and the memory 1220 that stores instructions executable by the one or more processors 1210. When the executable instructions are executed by the one or more processors 1210, the one or more processors 1210 may allocate time resources and physical strength resources to each of the user characters including the first user character and the second user character.

In an embodiment, the one or more processors 1210 may reduce the time resources respectively held by the user characters as time elapses when a game stage starts. The one or more processors 1210 may reduce the time resources based on a first time reduction rate in a first game stage and may reduce the time resources based on a second time reduction rate faster than the first time reduction rate in a second game stage.

When at least one first event occurs, the one or more processors 1210 may reduce the time resource held by the first user character. In an embodiment, when a first event occurs in which the physical strength resource of the first user character reaches a first threshold value due to an attack by the second user character, the one or more processors 1210 may reduce the time resource held by the first user character by a preset amount of reduction. When a first event occurs in the game stage, in which a purchase selection input for a skill usable by the first user character or an upgrade request input for a skill possessed by the first user character is received, the one or more processors 1210 may reduce the time resource held by the first user character.

When at least one second event distinguished from the first event occurs, the one or more processors 1210 may increase the time resource held by the first user character. In an embodiment, when a second event occurs, in which the physical strength resource of the second user character reaches the first threshold value due to an attack by the first user character, the one or more processors 1210 may increase the time resource held by the first user character. When the physical strength resource of the second user character reaches the first threshold value due to an attack by the first user character, the one or more processors 1210 may determine an amount of increase in the time resource of the first user character based on the time resource held by the second user character and may increase the time resource of the first user character by the determined amount of increase.

In an embodiment, when the game is played in a team battle mode, the user characters may include a first user character, a second user character, a third user character, and a fourth user character. It is assumed that the first user character and the third user character belong to a first team, and the second user character and the fourth user character belong to a second team distinguished from the first team. When the first user character is positioned within a reference distance from the third user character on the game map, the one or more processors 1210 may control to display a visual object representing that a distance between the first user character and the third user character is within the reference distance on a user terminal.

In an embodiment, while the distance between the first user character and the third user character is within the reference distance, when a second event occurs, in which the physical strength resource of the second user character or the fourth user character reaches the first threshold value by an attack by the third user character, the one or more processors 1210 may increase the time resource held by the first user character.

In an embodiment, while the distance between the first user character and the third user character is within the reference distance, when a second event occurs, in which the third user character acquires a time resource replenishment item existing on the game map, the one or more processors 1210 may increase the time resource held by the first user character.

In an embodiment, the one or more processors 1210, in response to a time resource transmission request from the first user character to the third user character, when receiving a user input corresponding to a preset reference input from a user terminal of the third user character, may add at least a portion of the time resource held by the third user character to the time resource held by the first user character.

Besides the description provided with reference to FIG. 12, the description provided with reference to FIG. 2 applies to the operations of the game service method performed by the one or more processors 1210.

FIG. 13 is a block diagram illustrating a configuration of a user terminal according to an embodiment.

Referring to FIG. 13, a user terminal 1300 may be a device that receives a game service provided by a game service device (e.g., the game service device 110 of FIG. 1 or the game service device 1200 of FIG. 12). The user terminal 1300 may correspond to the user terminal (e.g., the user terminals 122, 124, 126, and 128 of FIG. 1) described herein.

The user terminal 1300 may include a processor 1310, a memory 1320, a communication circuit 1330, a display 1340, and a communication bus 1350. Components of the user terminal 1300 may communicate with one another through the communication bus 1350. In an embodiment, some of the components may be omitted from the user terminal 1300, or another component (e.g., an input circuit) may be added to the user terminal 1300.

The processor 1310 may control other components (e.g., hardware or software components) of the user terminal 1300 and may perform various types of data processing or operations. In an embodiment, as at least a part of data processing or operations, the processor 1310 may store instructions or data received from another component in the memory 1320, may process the instructions or the data stored in the memory 1320, and may store the resulting data in the memory 1320.

The processor 1310 may include a main processor (e.g., a CPU or an AP) or an auxiliary processor (e.g., a GPU, an NPU, an ISP, a sensor hub processor, or a CP) that is operable independently of or in conjunction with the main processor.

The memory 1320 may store various pieces of data used by the components (e.g., the processor 1310 or the communication circuit 1330) of the user terminal 1300. The various pieces of data may include, for example, a game service-related program (e.g., an application) and input data or output data for instructions related thereto. The memory 1320 may store one or more instructions executable by the processor 1310. The memory 1320 may include a volatile memory or a non-volatile memory.

The communication circuit 1330 may support establishing a direct (e.g., wired) or wireless communication channel between the user terminal 1300 and another device (e.g., the game service device) and may support communication through the established communication channel. For example, the communication circuit 1330 may receive control data related to the game service from the game service device and may transmit play data related to a gameplay to the game service device. The communication circuit 1330 may include a communication circuit for performing a communication function. The communication circuit 1330 may include a CP that operates independently of the processor 1310 and supports direct (e.g., wired) or wireless communication. The communication circuit 1330 may include a wireless communication circuit (e.g., a Bluetooth™ communication circuit, a cellular communication circuit, a Wi-Fi communication circuit, or a GNSS communication circuit) that performs wireless communication or a wired communication circuit (e.g., a LAN communication circuit or a PLC circuit).

The display 1340 may visually provide information to the outside (e.g., a user) of the user terminal 1300. The display 1340 may include, for example, a light-emitting diode (LCD) or organic light-emitting diode (OLED) display, a hologram device, or a projector device. The display 1340 may further include a control circuit to control the driving of the display. In an embodiment, the display 1340 may further include a touch sensor configured to detect a touch. The display 1340 may output a game screen for the game service.

In an embodiment, the user terminal 1300 may further include an input circuit (not shown). The input circuit may receive instructions or data to be used for a component (e.g., the processor 1310) and a gameplay manipulation input from the outside (e.g., the user) of the user terminal 1300. The input circuit may include an input component circuit and receive a user input. The input circuit may include, for example, a touch recognition circuit for recognizing a touch on a key (e.g., a button) and/or a screen.

According to an aspect of the game service described above, in one round of a game determining a final winner (an individual or a team), like a game genre of a battle royale, by using an element of time resources decreasing over time, without closing or reducing a gameplay region on a game map, a degree of encounters of user characters may be gradually accelerated as the game progresses. In addition, by providing a game rule in which active exposure to a risk is advantageous to survival rather than passive gameplay (e.g., avoiding a battle, hiding, or preoccupying a position), active battle participation by users may be induced.

The game service described herein may provide fun, tension, and interest to the users playing the game by inducing active battles to secure the time resources. According to an aspect of the game service, when a user character kills another user character corresponding to an enemy, the user character may take a portion of a time resource held by the other user character and may increase their own time resource. As the time resource held by the other user character is greater, the time resource to be taken increases. Meanwhile, the user may strengthen their own user character by using the time resource held by the user character. If the user character holds a significant amount of time resource, the user character may be safe from a natural reduction in the time resource but may have a risk that a large amount of time resource is taken in proportion to the amount of the time resource held by the user character. To prevent this risk, the user may manage the risk by using the rest of the time resource, excluding an amount of time resource considered necessary, for the growth (e.g., a purchase and/or upgrade of skills/weapons) of their own user character. When an excessive amount of the time resource is used for the growth of the user character and fails to acquire an additional time resource, the user may be at risk of being out of the game or the game being game over. As such, the game service herein provides strategic fun about how the user playing the game uses the time resource held by the user character and causes tension to the user through various situations occurring according to strategic choices.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing unit also may access, store, manipulate, process, and generate data in response to execution of the software. For purpose of simplicity, the description of a processing unit is used as singular; however, one skilled in the art will appreciate that a processing unit may include multiple processing elements and multiple types of processing elements. For example, the processing unit may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), RAM, flash memory, and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

Therefore, other implementations, other examples, and equivalents to the claims are also within the scope of the following claims.

What is claimed is:

1. A game service method using a time resource element, the game service method comprising:

allocating a time resource and a physical strength resource to each of user characters comprising a first user character and a second user character;

when a game stage starts, reducing the time resource held by each of the user characters as time elapses;

when at least one first event occurs, reducing the time resource held by the first user character; and, when at least one second event distinguished from the first event occurs, increasing the time resource held by the first user character, wherein the increasing the time resource comprises:

when the second event occurs where the physical strength resource of the second user character reaches a first threshold value due to an attack by the first user character, increasing the time resource held by the first user character, wherein the game stage comprises a plurality of game stages sequentially starting as time elapses, wherein the game stages comprise a first game stage starting at a first time and a second game stage starting at a second time that is later than the first time, and the reducing the time resource comprises:

reducing the time resource in the first game stage based on a first time reduction rate; and reducing the time resource in the second game stage based on a second time reduction rate that is faster than the first time reduction rate.

2. The game service method of claim 1, wherein the increasing the time resource of the first user character comprises:

when the physical strength resource of the second user character reaches the first threshold value due to an attack by the first user character, determining an amount of increase in the time resource of the first user character based on the time resource held by the second user character; and increasing the time resource of the first user character by the determined amount of increase.

3. The game service method of claim 2, wherein, as the time resource held by the second user character is greater, the amount of increase in the time resource of the first user character increases.

4. The game service method of claim 1, wherein the reducing the time resource comprises:

when the first event occurs where the physical strength resource of the first user character reaches the first threshold value due to an attack by the second user character, reducing the time resource held by the first user character by a preset amount of reduction.

5. The game service method of claim 1, further comprising:

when the first user character is attacked by the second user character, reducing the physical strength resource held by the first user character;

when the physical strength resource of the first user character reaches the first threshold value, determining whether the time resource of the first user character is greater than a second threshold value; and, when the time resource of the first user character is greater than the second threshold value, determining to respawn the first user character.

6. The game service method of claim 1, further comprising:

determining a target user character who wins a game based on the time resources held by the user characters, wherein the determining the target user character comprises:

when the first user character of the user characters is the only user character with a remaining time resource, determining the first user character as the target user character.

7. The game service method of claim 1, further comprising:

determining a target user character who wins a game based on the time resources held by the user characters, wherein the determining the target user character comprises:

when a set time has elapsed, determining the user character with the greatest time resource of the time resources respectively held by the user characters as the target user character.

8. The game service method of claim 1, wherein the reducing the time resource comprises:

when the first event of receiving a purchase selection input for a skill usable by the first user character or an upgrade request input for a skill possessed by the first user character occurs in the game stage, reducing the time resource held by the first user character.

9. The game service method of claim 1, wherein the increasing the time resource comprises:

when the second event occurs where the first user character acquires a time resource replenishment item existing on a game map, increasing the time resource held by the first user character by a time resource corresponding to the acquired time resource replenishment item.

10. A non-transitory computer-readable storage medium storing instructions that, when executed by a processor, cause the processor to perform the game service method of claim 1.

11. A game service method using a time resource element, the game service method comprising:

allocating a time resource and a physical strength resource to each of user characters comprising a first user character and a second user character;

when a game stage starts, reducing the time resource held by each of the user characters as time elapses;

when at least one first event occurs, reducing the time resource held by the first user character; and, when at least one second event distinguished from the first event occurs, increasing the time resource held by the first user character, wherein the increasing the time resource comprises:

when the second event occurs where the physical strength resource of the second user character reaches a first threshold value due to an attack by the first user character, increasing the time resource held by the first user character, wherein the user characters further comprise a third user character and a fourth user character, wherein the first user character and the third user character belong to a first team, and the second user character and the fourth user character belong to a second team distinguished from the first team, and the game service method further comprises, when the first user character is positioned within a reference distance from the third user character on a game map, controlling to output a visual object representing that a distance between the first user character and the third user character is within the reference distance on a screen of a user terminal.

12. The game service method of claim 11, wherein the increasing the time resource comprises:

when the distance between the first user character and the third user character is within the reference distance, and the second event occurs where the physical strength resource of the second user character or the fourth user character reaches the first threshold value due to an attack by the third user character, increasing the time resource held by the first user character.

13. The game service method of claim 11, wherein the increasing the time resource comprises:

when the distance between the first user character and the third user character is within the reference distance, and the second event occurs where the third user character acquires a time resource replenishment item existing on the game map, increasing the time resource held by the first user character.

14. The game service method of claim 11, wherein the increasing the time resource comprises:

in response to a time resource transmission request from the first user character to the third user character, when receiving a user input corresponding to a preset reference input from a user terminal of the third user character, adding at least a portion of the time resource held by the third user character to the time resource held by the first user character.

15. The game service method of claim 11, further comprising determining a target team that wins a game based on time resources held by the user characters, wherein the determining the target team comprises, when the first team of teams comprising one or more user characters is the only team comprising a user character with a remaining time resource, determining the first team as the target team.

16. A game service device comprising:

a communication circuit configured to communicate with user terminals configured to manipulate each of user characters comprising a first user character and a second user character;

one or more processors configured to control a game service according to the manipulation of each of the user characters; and a memory configured to store instructions executable by the one or more processors, wherein, when the executable instructions are executed by the one or more processors, the one or more processors are configured to allocate a time resource and a physical strength resource to each of the user characters comprising the first user character and the second user character, when a game stage starts, reduce the time resource held by each of the user characters as time elapses, when at least one first event occurs, reduce the time resource held by the first user character, and when at least one second event distinguished from the first event occurs, increase the time resource held by the first user character, wherein the one or more processors are further configured to, when the first event of receiving a purchase selection input for a skill usable by the first user character or an upgrade request input for a skill possessed by the first user character occurs in the game stage, reduce the time resource held by the first user character.

17. The game service device of claim 16, wherein the one or more processors are further configured to, when the second event occurs where the physical strength resource of the second user character reaches a first threshold value due to an attack by the first user character, increase the time resource held by the first user character.

18. The game service device of claim 17, wherein the one or more processors are further configured to, when the physical strength resource of the second user character reaches the first threshold value due to an attack by the first user character, determine an amount of increase in the time resource of the first user character based on the time resource held by the second user character, and increase the time resource of the first user character by the determined amount of increase.

19. The game service device of claim 18, wherein the one or more processors are further configured to, when the first event occurs where the physical strength resource of the first user character reaches the first threshold value due to an attack by the second user character, reduce the time resource held by the first user character by a preset amount of reduction.

* * * * *